United States Patent [19]
West, Jr.

[11] 3,855,645
[45] Dec. 24, 1974

[54] INCINERATING COMMODE
[76] Inventor: James I. West, Jr., 7856 Fielder Rd., Jonesboro, Ga. 30236
[22] Filed: Aug. 10, 1973
[21] Appl. No.: 387,237

Related U.S. Application Data
[63] Continuation-in-part of Ser. No. 250,232, May 4, 1972.

[52] U.S. Cl................................ 4/131, 4/118, 110/9
[51] Int. Cl............................................. A47k 11/02
[58] Field of Search.............. 4/131, 118; 110/9, 9 E

[56] References Cited
UNITED STATES PATENTS

| | | | |
|---|---|---|---|
| 3,103,017 | 9/1963 | La Mere | 4/131 |
| 3,227,114 | 1/1966 | Anderson | 4/131 X |
| 3,230,913 | 1/1966 | La Mere | 4/131 X |
| 3,319,588 | 5/1967 | Duncan | 110/9 |
| 3,320,907 | 5/1967 | Duncan | 110/9 |
| 3,474,468 | 10/1969 | Blankenship | 4/131 |
| 3,694,825 | 10/1972 | Kufrin et al | 4/131 |
| 3,725,963 | /1973 | Speer | 4/131 |

*Primary Examiner*—Henry K. Artis

[57] ABSTRACT

An incinerating commode for use in disposing of human waste, including a commode body having seat means operatively associated therewith whereby the commode can be used for receiving waste deposited by a human. A combustion chamber having a shaped combustion pot is located below the commode body whereby human waste can be transferred by gravity from the commode body into the combustion pot. Closure means is operatively supported between the commode body and the combustion chamber for effecting a closure of the combustion chamber during an incinerating operation. Cyclically operable heat source means is operatively associated with the combustion chamber for developing a combustion flame into and beneath the combustion pot to cause human waste deposited therein to be incinerated and includes comminuting means for reducing the particle size of waste material being incinerated. Blower means, vacuum means and water spray means are provided for cooling the combustion chamber and purging the ash by-products of combustion from the combustion chamber in response to completion of an incinerating operation, with the vacuum means being operative to develop a slight vacuum draft during use of the commode for removing odors. The incinerating commode includes control means for initiating and for controlling the length of the combustion operation, including incinerating, cooling and purging.

13 Claims, 4 Drawing Figures

INCINERATING COMMODE

CROSS REFERENCE TO RELATED APPLICATION

This application is continuation-in-part application of prior U.S. application, Ser. No. 250,232 for INCINERATING COMMODE, filed may 4, 1972.

BACKGROUND OF THE INVENTION

The invention relates to an apparatus for use in disposing of human waste and is more particularly concerned with a commode capable of incinerating waste.

In the field of human waste disposal, a number of methods have been employed for disposing of the solid and liquid waste. Commonly, sewage treatment plants are provided which are connected via sewage pipelines to domestic and commercial facilities. As population has increased, the capabilities of the sewage treatment plants have been severely strained and many such plants have been unable to satisfactorily process the increased waste of the community. Such inadequacy of sewage plant facilities has necessitated the expansion of the facilities at great expense to the taxpayers. In addition, the inadequacy of the sewage treatment facilities has also led to the pollution of streams and rivers normally used for water supply and recreational facilities.

In remote areas where sewage treatment facilities are not available, septic tank means are often employed to dispose of the human waste. A septic tank utilizes bacterial action in the tank to dispose of solid waste and utilizes a subterranean drainage field for disposing of the liquid waste. However, in certain areas where the soil conditions are not satisfactory, utilization of septic tanks creates unhealthy conditions in their use. A number of municipalities have adopted strict codes to regulate the use of septic tanks.

In remote areas where a sewage treatment facility is not available and wherein septic tanks are not feasible, oxidation ponds are employed to dispose of human waste. In utilizing oxidation ponds, a fungus is utilized to dispose of the solid waste with the liquid waste being disposed of through evaporation or sufrace drainage means. The use of oxidation ponds requires a large ground area and is unattractive in appearance.

A number of attempts have been made to devise chemical and incinerating commode facilities for use in disposing of human waste. However, the prior art chemical and incinerating human waste disposal apparatuses are extremely complex in construction and operation, uneconomical to manufacture and unreliable in performance. A primary disadvantage of prior art incinerating commodes is the cyclic time required to complete an incinerating operation and cool the commode for use.

Another disadvantage is that after an incinerating operation considerable ash by-products of combustion remain in the combustion chamber requiring periodic cleaning.

SUMMARY OF THE INVENTION

The above disadvantages of the prior art have been overcome by the present invention which basically includes an upwardly open commode body disposed above an incinerating combustion chamber having a combustion pot wherein the human waste can be deposited in the commode body and transferred by gravity into the combustion pot. The combustion pot includes waste comminuting means for reducing the particle size of human waste to be incinerated and includes heat source means operative for incinerating the comminuted humann waste.

An important feature of the present invention includes the shape of the combustion pot and the location of the heat source means whereby an incinerating flame is directed into and beneath the combustion pot during an incinerating operation.

Another important feature of the present invention includes the provision of controlled blower and vacuum means for effectively purging the commode after an incinerating operation, with the vacuum means being operable for developing a slight vacuum while the commode is being used in order to remove odor.

A further feature includes the use of a controlled amount of water spray for effectively steam cleaning and cooling the combustion pot.

Fluid flushing means is connected to the commode body and controlled by selectively operable means for dispensing a predetermined amount of cleansing fluid into the commode body.

An additional feature of the present invention includes control means operable for effecting an automatic cycle of an incinerating operation.

It is therefore a primary object of the present invention to provide an incinerating commode effective for disposing of human waste.

Another object of this invention is to provide an incinerating commode whereby the human waste can be transferred from the commode body to a combustion chamber by gravity.

A further object of this invention is to provide means for cooling the combustion chamber after an incinerating operation.

A still further object of this invention is to provide an incinerating commode having means for reducing the particle size of waste to be incinerated.

A further object of this invention is to provide an incinerating commode having means for trapping liquid waste adjacent a combustion chamber whereby intense heat developed in the combustion chamber will evaporate the liquid waste material.

Still another object of this invention is to provide an incinerating commode having selectively operable closure means operable for initiating an incinerating operation.

Another object of this invention is to provide blower means, vacuum means, and water spray means operatively associated with a commode body and automatically controlled in their operation to purge both gas and ash by-products of combustion in response to completion of an incinerating operation and effectively cool the commode.

An additional object of this invention is to provide an incinerating commode operable for the disposal of human waste which is simple in construction and operation, economical to manufacture and reliable in performance.

These and other objects and advantages in the details of construction will become apparent upon reading the following description of the illustrative embodiments embodying the principles of the present invention, with reference to the attached drawings wherein like reference numerals have been used to refer to like parts throughout the several figures, and wherein:

DESCRIPTION OF THE ILLUSTRATIVE EMBODIMENT

Figure 1:
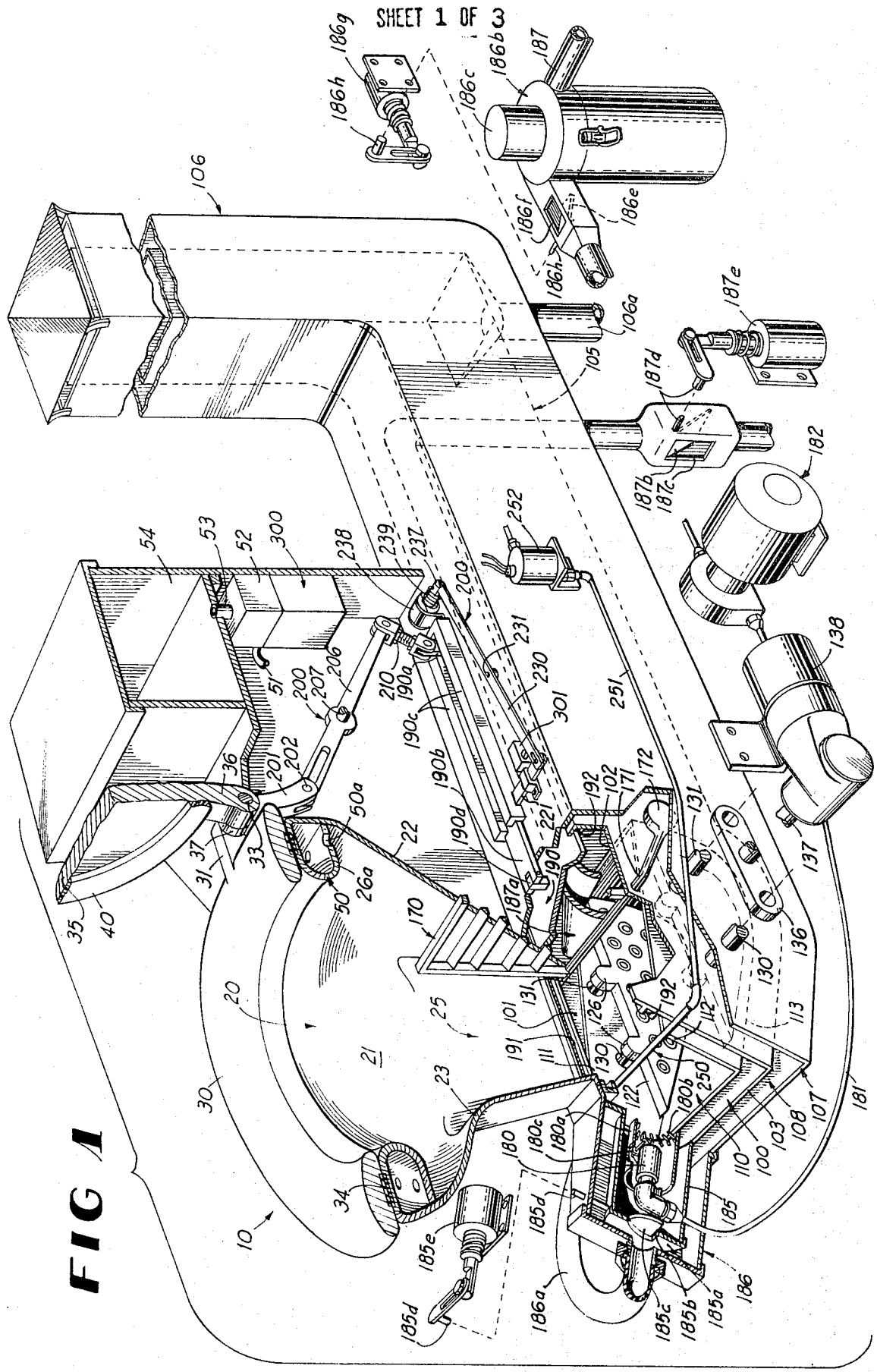
FIG. 1 is a perspective view of an incinerating commode embodying the principles of the present invention, with parts broken away and shown in section and parts shown in an exploded position for purpose of clarity.

Referring now to the drawing, the incinerating commode embodying the principles of the present invention is shown and generally represented by the reference numeral 10. The incinerating commode 10 includes a commode body 20 supported above a combustion chamber 100.

Figure 2:
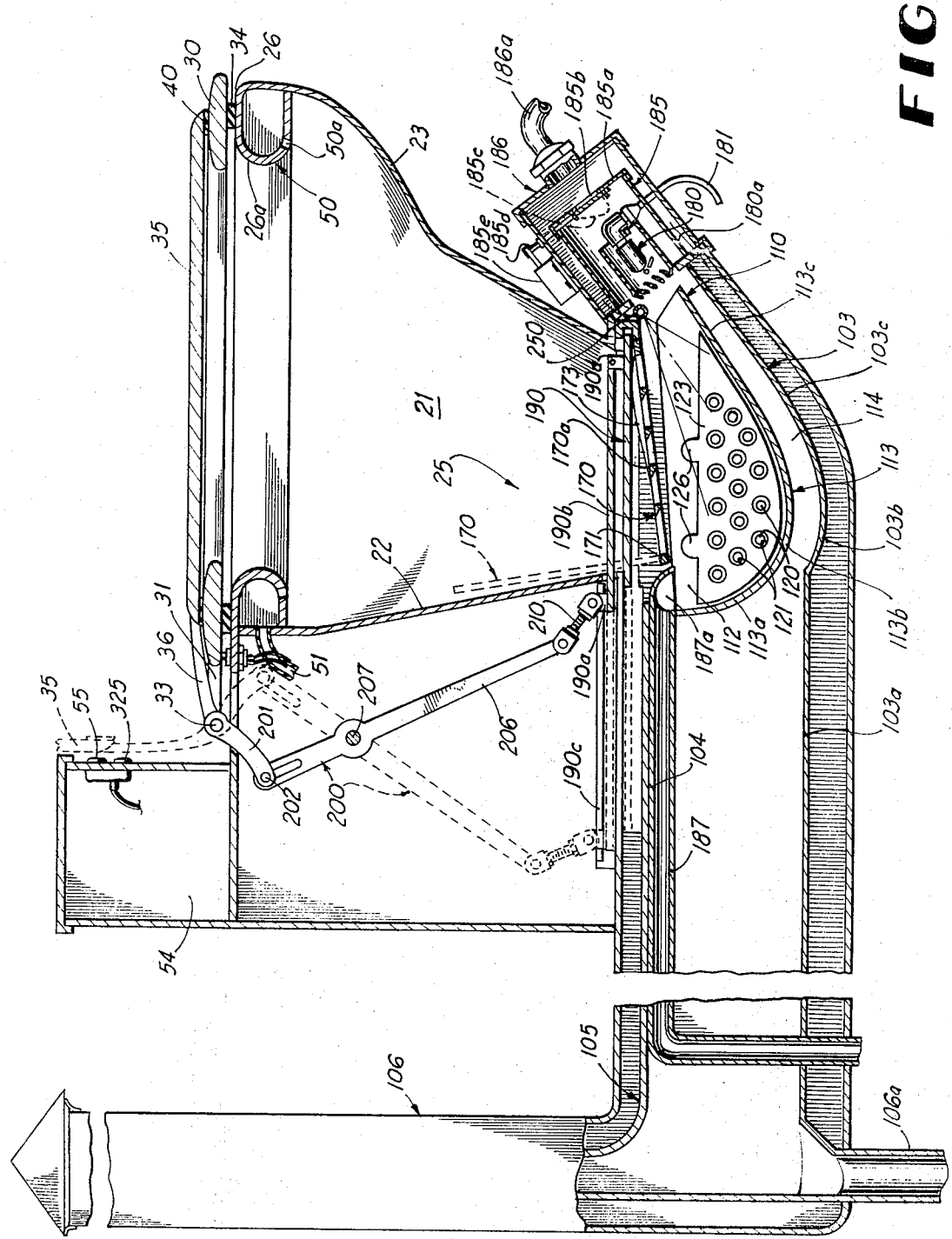
FIG. 2 is a vertical sectional view taken longitudinally through the commode with certain parts omitted and certain parts added thereto for purpose clarity.

As shown in FIGS. 1 and 2, the waste receiving commode body 20 includes downwardly converging sidewalls 21, a downwardly, inwardly sloping rearwall 22 and a downwardly sloping inwardly curved frontwall 23. The bottom edges of commode body walls 21–23 define a discharge opening 25, through which waste can be transferred to a combustion chamber as will be described below.

As shown in FIGS. 1 and 2, the commode 10 includes a commode seat 30 having a pair of rearwardly extending pivot support brackets 31 (only one of which is shown in FIGS. 1) which are rotatably supported on a transverse hinge pin 33. The commode seat 30 is provided with an annular seal member 34 which is attached to the bottom surface of the commode seat and is adapted to be supported in abutting contact with the top horizontal supporting surface 26 formed by inwardly and downwardly curved flanges of walls 21–23. A commode closure lid 35 is supported above seat means 30 in a conventional manner and includes a rearwardly extending support bracket 36.

Hinge pin 33 is pivotally supported by a support block which includes a pair of horizontally spaced upstanding support members 37 (only one of which is shown) provided with coaxially aligned openings complimentary to hinge pin 33 and are adapted to pivotally support hinge pin 33. The support members 37 are horizontally spaced to provide sufficient space for receiving the lid pivot support bracket 36. The seat brackets 31 and lid bracket 36 are pivotally carried by hinge pin 33. The commode closure lid 35 is also provided with annular sealing member 40 which is adapted to contact and effect a sealed relationship with the upper surface of seat 30 when in a closed position.

As shown in FIGS. 1 and 2, the commode body is provided with an annular cleansing fluid dispensing manifold 50 which is formed by the housing downwardly, inwardly turned flanges 26a of the commode body walls 21–23 and includes a number of openings 50a for dispensing a cleansing fluid downwardly along the surface of the commode body walls 21–23 so that they can be effectively cleansed after use. The dispensing manifold 50 is operatively connected by a supply line 51 (FIG. 2) to fluid pump means 52. The fluid pump means 52 includes a conventional electrical motor means operable for dispensing a predetermined quantity of fluid in response to each cyclic operation. Fluid is supplied to the pump means 52 through a supply line 53. Supply line 53 is connected in fluid flow communication with a fluid reservoir 54.

As shown in FIGS 1 and 2, a conventional switch actuator 55 is provided for effecting cyclic operation of the pump means 52 whereby a predetermined quantity of cleansing fluid is dispensed from the reservoir means 54 through supply lines 53 and input supply line 51 to the dispensing manifold 50. Even though switch 55 is shown located on reservoir 54 for manual operation, it is apparent that switch 55 could be located in a position to be automatically operated by movement of lid 35 to a closed position. The sequence of operation of the fluid dispensing means will be described in detail below in the description of the operation of the incinerating commode.

Referring now particularly to FIGS. 1 and 2, the incinerating commode 10 includes a combustion chamber generally represented by the reference numeral 100. The combustion chamber 100 is supported below the commode body discharge opening 25 whereby waste deposited in the commode body can be transferred by gravity to the combustion chamber. The combustion chamber includes a pair of horizontally spaced parallel vertical sidewalls 101, 102. The combustion chamber is provided with a bottom wall 103 which includes a rearwardly extending horizontal portion 103a, a downwardly recessed liquid trap portion 103b, and an upwardly angled wall portion 103c. As shown in FIG. 2, a horizontal topwall 104 is connected between sidewalls 101, 102 in vertically spaced parallel relationship with horizontal bottomwall portion 103a to define a discharge conduit portion 105. The discharge conduit portion 105 is adapted to be connected in fluid flow communication with conventional vent exhaust filter means 106 and liquid overflow conduit means 106a as described in applicant's above mentioned co-pending application and reference is made to applicant's above mentioned co-pending application for details of construction of the discharge conduit and filter means 106. The combustion chamber 100 is provided with an outer housing 107 forming an air cooling passageway 108 around the combustion chamber conduit portions 101–105 to permit cooling air to be directed therethrough in an incinerating operation. The outer housing 107 is also connected in flow communication with the vent filter means 106, as described in applicant's co-pending application.

The combustion chamber 100 includes a combustion and waste receiving pot 110. The combustion pot 110 is supported within the combustion chamber defined by sidewalls 101, 102 and bottomwall 103. Combustion pot 110 includes a pair of parallel vertically extending sidewalls 111, 112 and a curved bottomwall structure 113. The curved bottomwall structure 113 includes an upwardly curved rearwall portion 113a, a concave bottom portion 113b and an upwardly angled frontwall portion 113c. The concave bottomwall portion 113b and upwradly angled frontwall portion 113c are supported in vertically spaced relationship relative to the combustion chamber wall portion 103b, 103c, respectively, to define an airflow passageway 114.

The combustion chamber waste receiving pot sidewalls 111, 112 are provided with a plurality of horizontally extending lug projections 120. The horizontal lug projections 120 are provided for cooperation with aligned complimentary openings 121 formed in a pair of reciprocally operable comminuting plates 122, 123. Each of the comminuting plates 122, 123 is provided with a plurality of openings 121. The comminuting plates 122, 123 include a pair of upstanding projections 126. The upper end of projections 126 are fixed to horizontal laterally extending rod members 130, 131. Rod members 130, 131 are extended through complimentary openings formed in the combustion pot sidewalls 111, 112 combustion chamber sidewalls 101, 102 and outer housing 107. The outer ends of rod members 130, 131 are fixed to connecting member 136. The connecting member 136 is fixed to a reciprocating drive shaft 137 which extends from a conventional motor drive means 138. Drive motor 138 is provided with a conventional rotary-to-reciprocating drive means (not shown) which is connected to the member 136 such that reciprocating movement of member 136 will in turn provide a reciprocating movement to the comminuting plates 122, 123 (only one reciprocating drive motor 138 is shown, but it is to be understood that plate 122 would have a drive identical to the drive shown for plate 123).

Reciprocating movement of member 136 will effect reciprocating operation of the comminuting plates 122, 123 such that they move inwardly into substantially abutting contact with each other and are then advanced laterally outward to a position adjacent the combustion pot sidewalls 111, 112. During the inward movement of the comminuting plates 122, 123, material supported therebetween would be broken up and forced out through the plate openings 121. During an outward displacement of the comminuting plates 122, 123 the plates will be advanced to the position whereby the horizontal lug members 120 will project through the openings 121 and will remove any material lodged within the openings. During an incinerating operation, the comminuting plates 122, 123 are continually reciprocated inwardly and outwardly relative to each other to effectively break up waste material deposited in the combustion pot 110 whereby the waste material can be more effectively burned during an incinerating operation. A sequence of operation of the waste comminuting plates 122, 123 will be described in more detail hereinbelow in the description of the operation of the incinerating commode.

As shown in FIGS. 1 and 2, the combustion pot 110 is provided with a lid 170. Lid 170 is supported for pivotal movement from an open position, as shown in dotted lines of FIGS. 2, to a closed position by a cross support shaft 171. Cross support shaft 171 is pivotally supported by complimentary openings formed in the combustion chamber sidewalls 101, 102. The combustion pot lid 170 is provided with plurality of transversely extending members 172 which define elongated openings 172a detailed in size to permit airflow therethrough without permitting the waste material contained in the combustion pot to be blown from the combustion pot when the lid is in a closed position. In the open position lid will allow waste and paper to be transferred into combustion pot 110 and movement of lid 170 to the closed position will operate to force any toilet paper downwardly into the pot.

The lid is moved from the open to the closed position by means of a camming element 173 which is supported on the upper surface of the lid. Camming element 173 is operatively associated with a second closure lid means as will be described in more detail hereinbelow for effecting movement of lid 170 to a closed position. Lid 170 is moved to an upwardly extending open position by means of a counterweight 175 which is connected by a link member 176 to the pivot support shaft 171 so that the lid will automatically pivot to the opened position when not held in the closed position by the second closure lid. Reference is again made to applicant's above mentioned co-pending application for additional details of the shape of the combustion pot, the details of the comminuting means and the details of closure lid 170.

As shown in FIGS. 1 and 2, the combustion chamber 100 is provided with a burner nozzle 180 which is supplied with a gas and pressurized air mixture through conduit means 181. The conduit means 181 is operatively associated with conventional fuel supply pump 182. The burner nozzle 180 is detailed in angular location relative to the combustion pot bottomwall 113 such that approximately ninety percent of the flame developed by the burner nozzle will be directed downwardly into the combustion pot and approximately 10 percent of the flame will be directed through the passageway 114 formed between the combustion chamber bottomwall portion 103c and the combustion pot wall portion 113c. The angular location of the burner nozzle 180 such that the flame is directed both into the combustion pot 110 and beneath the surface of the combustion pot is important in effecting a quick and efficient incineration of waste products contained in the combustion pot.

The burner nozzle 180 is supported in the above described position by a cylindrical shroud 180a having circumferentially arranged, angular air flow directing vanes 180b and includes a conventional spark igniter 180c. A second shroud 185 is supported around shroud 180a and is provided with an end enclosure 185a having an air flow opening 185b which is selectively opened to permit air flow therethrough by a hinged door 185c. Door 185c is fixed to shaft 185d which is operatively connected to a solenoid 185e for effecting movement of door 185c between the opened and closed positions. A third shroud 186 is provided around shroud 185 and is connected to the front of the combustion chamber walls 101, 102 in such a way that air flow can be directed between shroud 185 and 186 into the air flow passageway 108 surrounding the combustion chamber. Air flow is delivered to shroud 186 by conduit means 186a which is detailed in location for directing a blast of air pressure through opening 185b when door 185c is moved to the open position. When door 185c is in the closed position, the air flow through conduit means 186a will be directed into the air cooling passageway 108 surrounding the combustion chamber and when door 185c is moved to the open position, a blast of air will be directed through opening 185b for use in purging the combustion chamber of the by-products of combustion.

Conduit means 186a is connected in flow communication with a conventional air pressure and vacuum producing means 186b which is driven by a conventional electric motor 186c and includes a trap chamber 186d. Conduit means 186a is provided with a hinged air directing plate 186e supported adjacent opening 186f so that air pressure developed by operation of motor 186c can be directed either out through opening 186f or can be directed through conduit means 186a into shroud 186. Plate 186e is controlled for movement between opened and closed positions by a solenoid 186g which is operatively connected to a plate support and pivot shaft 186h.

As shown in FIG. 1, the air pressure and vacuum producing means 186a includes a vacuum conduit 187 which extends up through a rear portion of the combustion chamber purging conduits and extends forwardly to a vacuum exhaust head 187a located adjacent upper rear edge of combustion pot 110. The vacuum conduit 187 is provided with an air flow directing plate 187b hinged adjacent an opening 187c. Plate 187b is fixed to a pivot support shaft 187d which is operatively connected to solenoid 187e used for controlling movement of plate 187b between open and closed positions. In the closed position, the full vacuum developed will be directed to vacuum exhaust head 187a for use in removing the ash by-products of combustion from the combustion pot. The size of plate 187b is detailed so that movement of the plate to the open position will allow a slight draft vacuum to be developed through the exhaust head 187a so that the odors created during use of the commode will be removed through conduit 187 and so that any fly ash created during an incinerating operation will be removed through conduit 187.

The incinerating commode includes an additional closure lid 190 which is supported between the combustion chamber 100 and the commode body discharge opening 25. The additional closure lid 190 is horizontally oriented and is supported along its lateral side edges by a pair of inwardly directed guide tracks 191, 192, as shown in FIG. 2, and above combustion chamber top wall 104. Lid 190 is operatable for movement from an open position in which the material transferred through commode body discharge opening 25 can fall by gravity into the combustion pot 110 and is movable to a forwardly closed position wherein the forward edge of the lid is in sealing contact with the upper surface of the burner nozzle housing. When the lid 190 is in the forwardly advanced closed position, the combustion chamber will be effectively sealed so that the flame or heat source means developed by nozzle 180 will be confined within the area of the combustion chamber and the combustion pot. Lid 190 is moved between the forward closed position and the rearward open position by means of an actuator linkage mechanism which is operatively associated with the commode closure lid 35.

The actuator linkage mechanism is generally represented by the reference numeral 200 and includes a first lever member 201 which is fixed to closure lid bracket 36 such that angular movement of lid 35 will effect corresponding angular movement of lever 201. An extended end of lever 201 is connected by a conventional pin means 202 to a control lever 206. Control lever 206 is pivotally supported at an intermediate position by a pin 207 which is supported by housing frame means (not shown). An opposite end of control lever 206 is provided with an adjustable turnbuckle 210.

Turnbuckle 210 is operatively connected with an upstanding bracket 190a which is fixed to the upper surface of and adjacent the rear edge of lid closure member 190b. The lid closure member 190b is slidably supported by spaced angle members 190c and is connected at its forward end to an upstanding bracket 190d fixed to lid 190. When lid 35 is in a raised position, the control lever 206 is pivoted to a rearwardly extending position with the link member 190b and lid 190 displaced to the rear open position. Movement of lid 35 to a closed position will effect a counter-clockwise angular displacement of control lever 206 so that the link member 190b will slide lid 190 forward to a closed position.

When lid 190 is advanced to a forward closed position, the lid is latched in the closed position by a latch mechanism generally represented by the reference numeral 220. The latch mechanism 220 includes a latching link 221. Latching link 221 includes an edge which is supported in sliding contact with the side of link member 190b and will permit link 190b to slide relative thereto during movement to the lid to the forward closed position. When lid 190 is advanced to a complete closed position, latching link 221 is spring biased into position behind the rear edge of the closure member 190b to maintain the lid in a closed latched position. Latching link 221 is moved to an unlatched position by means of an elongated lever 230. Lever 230 is pivotally supported at 231 on housing wall structure with one end of lever 230 being provided with an elongated slot which receives pin means formed on latching link 221. An opposite end of lever 230 is pivotally connected by pin means to a solenoid plunger element 237. Solenoid plunger 237 is operatively supported for reciprocating movement within a conventional electrically operable solenoid means 238, with the plunger 237 being biased outwardly by a conventional compression spring means 239. The compression spring 239 will operate to effect biasing movement of lever 230 which will provide a pressure on latching link 221 such that the latching link will automatically move to a latched position behind the rear edge of lid closure member 190b when the lid is moved to the forward closed position by control lever 206.

When solenoid 238 is energized, lever 230 will be angularly displaced causing the latching link 221 to be moved to a position away from the rear edge of closure member 190b allowing the closure lid 190 to be rearwardly displaced to an open position.

Figure 3:
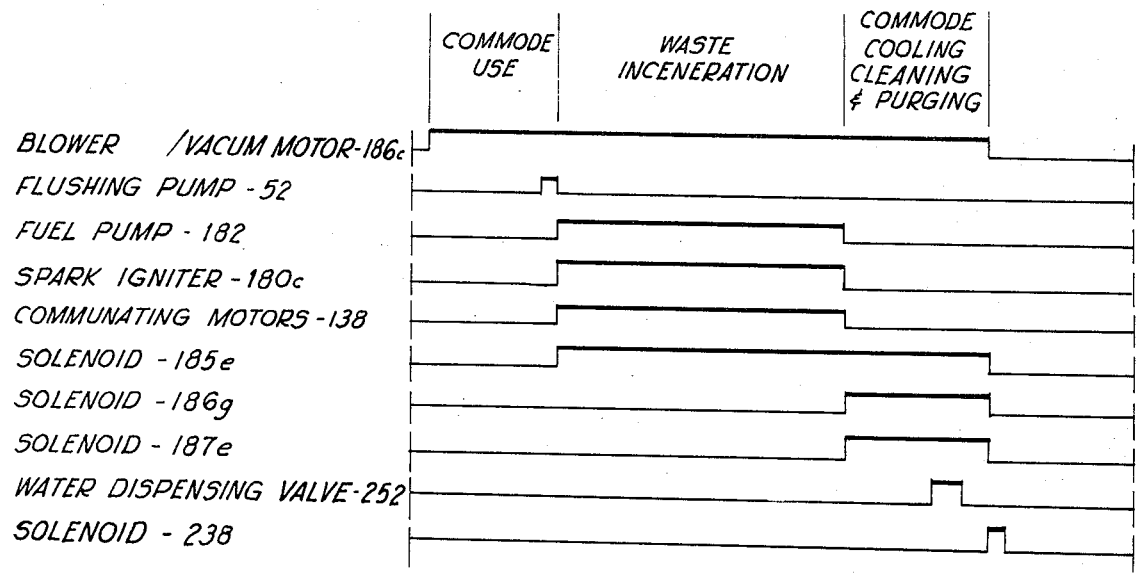
FIG. 3 is a timing chart showing the sequence of operation of the various operating components; and, FIG. 4 is an electrical schematic showing the electrical control components.

As shown in FIGS. 1, 2 and 3, the incinerating commode includes a water spray conduit 250 located above burner nozzle 180 and across the upper front edge of the combustion pot 110. Conduit 250 is connected by a supply line 251 to a conventional electrically operable dispensing valve 252 which is operable for dispensing a predetermined amount of water into the combustion pot after completion of an incinerating operation. The amount of water dispensed is controlled so that the water will effectively steam clean and cool the combustion pot so that no water residue is left in the combustion pot.

The incinerating commode 10 includes a conventional electrical control timer 300 (FIG. 1) operable for controlling a timed cycle of operation of the commode. A control switch 301 is operatively associated with latching lever 230 and is moved to an "on" current conducting position when latching link 221 is displaced to a lid latching position. Switch 301 is operatively connected to a timer motor 300a for initiating operation thereof when lid 190 is latched in a closed position. As shown in the electrical schematic of FIG.

4, timer 300 includes a number of control switches 302–310.

Switches 302, 303 and 304 are electrically connected to solenoids 185e, 186g and 187e, respectively, so that closing of the switches by timer 300 will effect operation of the respective solenoids.

Switch 305 is connected to spark igniter 180c and switch 306 is electrically connected to the fuel pump motor 182 so that operation of the switches 305, 306 will cause an incinerating flame to be developed. Switch 307 is electrically connected to the comminuting plate drive motors 138 so that closing of the switch 307 will effect operation of the comminuting plates 122, 123. Switch 308 is electrically connected to the air pressure and vacuum producing motor 186c. A second switch 308a, located in the commode body top 26 in a location to be operated when a person is seated on the commode seat 30, is also electrically connected to motor 186c for effecting operation thereof, as will be described in more detail below in the operation. Switch 309 is electrically connected to water dispensing valve 252 for effecting a controlled dispensing of water spray by operation of timer 300. Switch 310 is electrically connected to solenoid 238 which is operatively connected to latching link 221 whereby lids 35 and 190 can be unlatched after completion of an incinerating operation.

Additional switch means 307a is electrically connected to motors 138 for sensing the position of comminuting plates 122, 123 to ensure that the comminuting plates are stopped in outwardly displaced positions.

Figure 4:
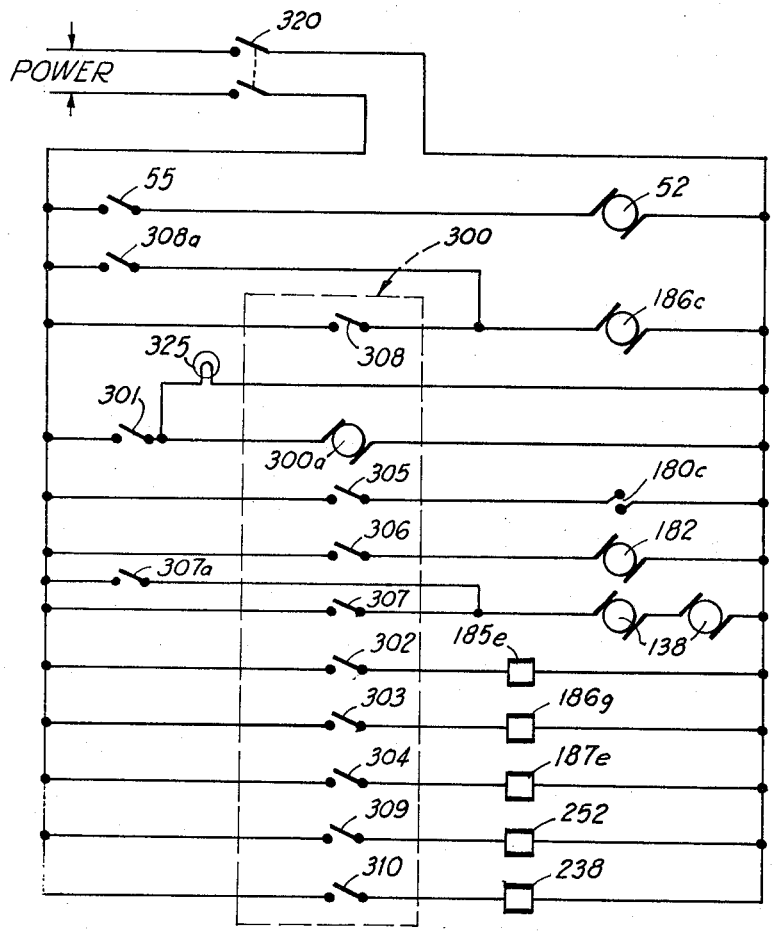

As shown in FIG. 4, the control circuitry includes an "on" and "off" master control switch 320 and a lamp means 325. Lamp means 325 is on anytime the burner nozzle 180 and cooling apparatus are operating.

OPERATION

In utilizing the incinerating commode embodying the principles of the present invention, the commode lid 35 is raised to an upwardly opened position, the closure lid 190 is in a rearwardly retracted position and the combustion pot lid 170 is in a pivoted upwardly open position to permit human waste deposited in the commode body to be transferred by gravity through conduit means 25 into the combustion pot 110.

When a person is seated on seat 30, switch 308a will be operated to effect operation of motor 186c whereby a vacuum will be developed through conduit 187 and with door 187b in an open position (FIG. 1) a slight draft vacuum will be created in the exhaust heat 187a so that the odors created during use of the commode will be exhausted through conduit 187. The slight draft vacuum will continue as long as a person is seated on seat 30 and during the incinerating operation, as shown by the timing chart of FIG. 5.

After waste has been deposited in the combustion pot 110 a waste incinerating operation is initiated by first effecting operation of the cleansing fluid dispensing control switch 55, either manually or automatically to cause a predetermined amount of cleaning fluid to be dispensed through manifold 50 to effectively cleanse the sidewalls 21–23 of the commode body with the cleansing fluid being discharged through openings 50a, downwardly through transfer conduit means 25 into the combustion pot 110.

Simultaneous with, or after operation of the cleansing fluid actuating switch 55, the closure lid 35 is moved to a horizontal commode closed position. During movement of lid 35 to the closed position, the control lever 206 will be pivoted in a counterclockwise direction (FIG. 2), causing lid 190 to be advanced forward to a closed position. After lid 190 reaches a closed position, the latching link 221 will be biased by solenoid compression spring 239 and control lever 230 to a displaced lid latching position to hold lids 35 and 190 in closed latched positions during an incinerating operation. When latching link 221 moves to a latching position, lever 230 will effect operation of switch 301 to energize the timer control motor 300a to initiate an incinerating cycle of operation. Operation of time 300 will immediately close switches 303 and 305–308 (FIG. 5) to supply power to solenoid 186g, to the comminuting plate drive motors 138, to blower, vacuum motor 186c, to the fuel pump motor 182 and to spark ignitor 180c to effect operation of the burner nozzle 180 such that a pressurized flame source will be directed into the combustion chamber as described above. During the incinerating operation, solenoid 186g will hold plate 186f closed so that cooling air can be directed through conduit 186a, shroud 186 to the passageway 108 surrounding chamber 100.

The burner nozzle and comminuting plates will continue to operate, under control of timer 300, for a predetermined time, which time is sufficient to complete an incineration of the liquid and solid waste contained in combustion pot 110. After completion of the incinerating operation, the timer will open switches 305–307 to stop operation of the spark igniter 180c, comminuting motors 138, and fuel pump motor 182, respectively. The blower, vacuum motor 186c will continue to operate and solenoid 186g will remain energized so that the air will continue to flow through conduit 186a. With the blower, vacuum motor 186c operating, the timer will close switches 302 and 304 to energize solenoids 185e and 187e so that plate 185c will be opened and plate 187b will be closed. With plate 185c open, a blast of air will be directed through opening 185b into the combustion pot 110 for dislodging all ash by-products of combustion from the combustion pot. Simultaneously with the blast of air into the combustion pot, a full vacuum will be developed in the exhaust head 187a to remove the ash by-products of combustion which are transferred to the collection chamber 186d.

After the full blast of air and full vacuum have removed the ash from the combustion pot 110, the timer will close switch 309 while holding switches 302 and 304 closed. Operation of switch 309 will cause water dispensing valve 252 to dispense a predetermined amount of water through conduit 250 into the blast of air so that the blast of air will create a fine spray and direct the spray to all parts of the combustion pot. The amount of water spray dispensed is sufficient to effectively steam clean and cool the combustion pot without leaving any excess water in the pot. Since the vacuum remains on during the water spraying operation, the steam developed in the cleansing and cooling operation will be exhausted through conduit 187.

After the combustion pot 110 has been effectively cooled, timer 300 will open switches 302–304, 308 and 309 and close switch 310 to energize solenoid 239 to cause latching link 221 to be withdrawn to an unlatched position so that lid 35 can be raised whereby the commode can again be used. The seal 40 on seat 35 will slightly bias lid 35 upwardly so that lid closure member 190b will be slightly displaced rearwardly from a latched position to allow solenoid 239 to be de-energized after momentary operation by timer 300. When a timed cycle of operation is completed, all control switches 301–310 will be open and the commode is conditioned for use by merely raising lid 35.

It now becomes apparent that the above described incinerating commode is capable of obtaining the above stated objects and advantages. It is obvious that those skilled in the art may make modifications in the details of construction without departing from the spirit of the invention which is to be limited only by the scope of the appended claims.

What is claimed is:

1. An incinerating commode for use in disposing of human waste comprising, in combination:
 a. A commode body defining seat means permitting human waste to be introduced therethrough;
 b. a combustion chamber located below and operatively associated with said seat means, said combustion chamber including a combustion pot for receiving waste introduced through said seat means;
 c. Heat source means operatively associated with said combustion chamber for incinerating waste contained therein, said heat source means detailed for developing an incinerating flame into said combustion pot;
 e. blower means operatively associated with said combustion chamber for directing an air flow therein;
 f. liquid medium cooling means operatively associated with said combustion chamber for spraying a cooling medium therein after an incinerating operation, said liquid medium spraying being operable to direct a spray into contact with said combustion pot after completion of said heat source means and wherein the amount of spray is controlled to effectively steam clean and simultaneously cool said combustion pot without leaving a residue of said cooling medium; and,
 g. means for initiating cyclic operation of heat source means, said blower means and said spraying of said liquid medium cooling means.

2. An incinerating commode as defined in claim 1 further characterized in that said commode includes vacuum means operatively associated with said combustion chamber for creating an exhaust vacuum therein, and wherein said vacuum means is cyclically operable for developing a slight draft or exhaust vacuum in said combustion pot, in response to a person being seated on said seat means, for exhausting odor therefrom during use of said commode.

3. An incinerating commode as defined in claim 1 further characterized in that said vacuum means is cyclically operable for developing a slight draft vacuum in said combustion pot during operation of said heat source means for removing fly ash created in an incinerating operation.

4. An incinerating commode as defined in claim 1 further characterized in that said vacuum means is cyclically operable for developing maximum vacuum in said combustion pot for a predetermined period of time after completion of an incinerating operation for removing all ash by-products of combustion from said combustion pot.

5. An incinerating commode as defined in claim 1 further characterized in that said blower means is cyclically operable for developing controlled air flow into said combustion pot during operation of said heat source means and is operable for developing a blast of air into said combustion pot for a predetermined period of time after an incinerating operation to effectively dislodge all ash by-products of combustion from said combustion pot.

6. An incinerating commode as defined in claim 1 further characterized in that said heat source is cyclically operable for developing a controlled amount of incinerating flame into said combustion pot and a controlled amount beneath said combustion pot for a predetermined period of time during an incinerating operation.

7. An incinerating commode as defined in claim 1 further characterized in that said vacuum means, said blower means, said heat source means and said liquid medium cooling means are cyclically and collectively operable in such a manner that said vacuum means will develop a slight draft vacuum in said combustion pot during use of said seat means and during operation of said heat source means followed by development of maximum vacuum after completion of said heat source means, said blower means will introduce a controlled amount of air flow into and around said combustion pot during operation of said heat source means and will introduce a blast of air into said combustion pot for a predetermined period of time after completion of said heat source means, with said blast of air being introduced simultaneously with development of said maximum vacuum, and wherein said liquid cooling medium is operable for spraying a controlled amount of water into said combustion pot after a predetermined period of operation of said blast of air, with said blast of air and said maximum vacuum to continue for a period of time after spraying said cooling water.

8. An incinerating commode as described in claim 1 further characterized in that comminuting means is operatively associated with said commode for reducing the particle size of said waste to be incinerated.

9. An incinerating commode as described in claim 8 further characterized in that said comminuting means for reducing the particle size of said waste to be incinerated includes a number of movably operable comminuting elements located in said combustion pot, said comminuting elements being effective for reducing the particle size of said waste contained in said combustion pot, and wherein said comminuting elements are operable in response to initiation of an incinerating cycle of operation.

10. An incinerating commode as described in claim 9 further characterized in that said comminuting meand for reducing the particle size of said waste includes a pair of comminuting elements reciprocally supported within said combustion pot and operable with respect to each other for effecting a reduction of the particle size of waste supported therebetween in said combustion pot, and wherein said comminuting elements are substantially complimentary in dimensions to the internal dimensions of said combustion pot.

11. An incinerating commode as defined in claim 1 further characterized in that said commode includes first closure means supported above said seat means and selectively movable between opened and closed positions and includes additional closure means operable between opened and closed positions and operatively associated with said commode between said seat means and said combustion chamber, said first closure means including means for effecting movement of said additional closure means between said opened and closed positions, and wherein said commode includes control means for initiating a cycle of operation of said blower means and said heat source means in response to movement of said additional closure means to said closed position.

12. An incinerating commode as defined in claim 1 further characterized in that said combustion pot includes spaced sidewall means connected by a downwardly sloping bottom wall curving upwardly into a vertically oriented rearwall, with said incinerating flame being directed along said downwardly sloping bottom wall such that a major portion of said flame is directed above said bottom wall into said combustion pot toward said rearwall and with a minor portion of said flame directed beneath said bottom wall.

13. An incinerating commode as defined in claim 12 further characterized in that said commode includes a pair of plates supported in said combustion pot and reciprocally operable relative to each other for reducing the size of waste located therebetween, and wherein said plates are substantially complimentary in shape and dimensions to the cross sectional area defined by the shape of said downwardly sloping and upwardly curved bottom and rearwall.

* * * * *